No. 842,841. PATENTED JAN. 29, 1907.
F. STARR.
CLUTCH.
APPLICATION FILED AUG. 15, 1906.
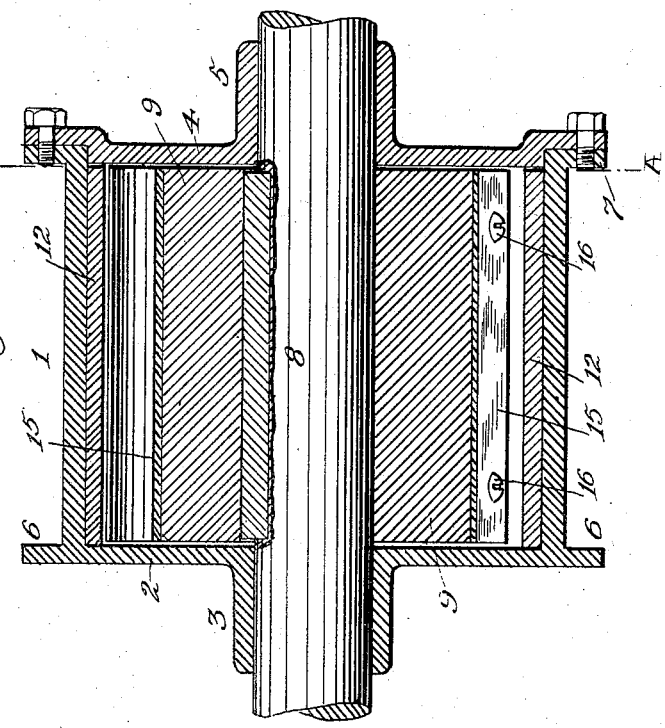
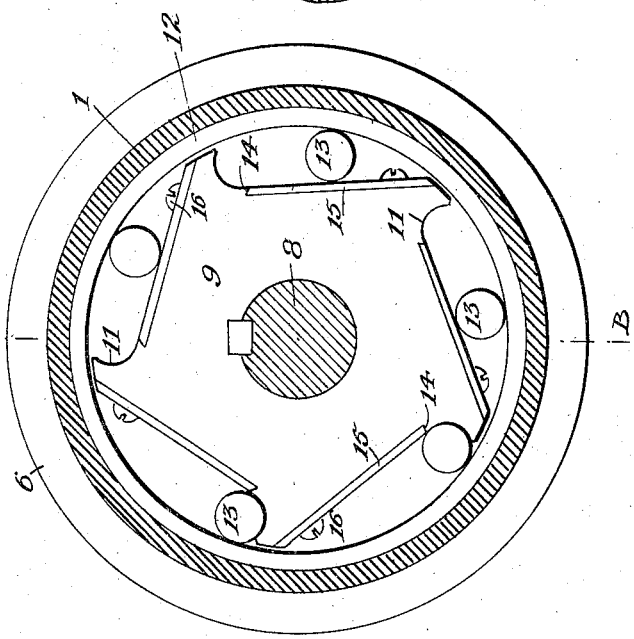
WITNESSES:
INVENTOR.
Fred Starr,
BY
Spear & Seely
ATTORNEYS.

UNITED STATES PATENT OFFICE.

FRED STARR, OF SAN FRANCISCO, CALIFORNIA.

CLUTCH.

No. 842,841.  Specification of Letters Patent.  Patented Jan. 29, 1907.

Application filed August 15, 1906. Serial No. 330,742.

*To all whom it may concern:*

Be it known that I, FRED STARR, a citizen of the United States, and a resident of the city and county of San Francisco, State of California, have invented certain new and useful Improvements in Clutches, of which the following is a specification.

My invention relates to clutch mechanisms of that class which is designed to transform an intermittent or oscillating motion into a rotary motion in one direction.

The general features of the invention comprises an exterior casing or hollow drum mounted loosely upon the shaft to which the rotary motion is to be imparted, which drum derives an oscillatory motion from any suitable source. Within the casing and keyed upon the rotary shaft is a clutch member or core having in its periphery a series of pockets which are inclined to any radius of the casing, so as to be wider at the bottom than at the top. Between the casing and the said clutch member are round bodies, such as balls or rollers, the diameter of each of which is slightly less than the space between the casing and clutch, where such space is wider, but greater than said space at the outer or top end. Oscillation of the casing in one direction will cause the rollers to be gripped between the casing and clutch, locking the casing to the driven shaft and transmitting a rotary motion to said shaft. Oscillation of the casing in the opposite direction will cause the rollers to return and seat themselves in the bottom of the pockets, so that no gripping action can occur.

On the outer or casing surface the wear is evenly distributed and is slow. On the plain surface it falls on a precise line, marking the point of grip where the distance between the two surfaces equals the diameter of the roller. Here immediately the wear begins and increases rapidly and always on the same place on the surface, since the roller cannot pass the depression of wear, even when it becomes so deep (as it soon does) as to impair the gripping action. Even slight wear weakens the grip and renders it necessary to frequently replace in the heavy work to which I put the clutch, the whole core. These are expensive, since they are made of the best hardened steel. The region of wear is across the plain surface and presents a transverse rounded valley corresponding in shape and location to the roller. This worn place cannot be reinforced after it is worn, since the other parts of the plain surface are not worn at all. It is necessary to get rid of the rut in the plain surface.

It is necessary at the outset to accurately make and adjust the parts so that the gripping-surfaces should be flaring from the gripping-point of the roller toward the axis, and also to space with precise accuracy the gripping-point. To meet these conditions, I have made the core of the ordinary shape in the main, but have recessed or cut away the plain bearing-surface of the core to a depth just equal to the thickness of the bearing-plate. This I fix detachably in the recess by any suitable means, preferably by a screw passing through the plate and into the core. This plate must be of the most durable hardened material whatever the metal of which the body of the core is made. When worn it may be turned upside down or end for end or replaced by another, and thus may do double service. Further, in case of the long usage the peripheral bearing becomes worn and a thicker plate may be used, proportioned accurately in thickness to the extent of wear of the outer bearing.

By this device, cheaply made and quickly applied, I have rendered the clutch practical in heavy work.

An embodiment of my invention is shown in the accompanying drawings, in which—

Figure 1 is a cross-section of the casing and shaft on the line A A of Fig. 2 and an end elevation of the inner clutch member. Fig. 2 is a longitudinal section of the clutch on the line B B of Fig. 1.

The numeral 1 represents the outer casing, which is a hollow cylinder made of any suitable material, such as cast-iron, and having one end closed by the integrally-formed head 2, provided with the hub and bearing 3. The other end of the casing is closed by a removable head 4, having a similar hub and bearing 5. Both ends of the casing have outwardly-projecting flanges 6 7, to the latter of which the removable head is securely bolted. The whole casing has a loose bearing upon the shaft 8, which is the shaft to which rotary motion is to be imparted.

Keyed upon the shaft within the casing is the inner clutch member 9, which is polygonal in end elevation, as shown in Fig. 1. It is there represented as of pentagonal form and has straight sides which, if completed, would be chords of arcs of the circular outer casing. Each side, however, merges into a curve at 11, which is extended into close proximity with the outer casing. In this manner a series of pockets is formed, which are bounded at their ends by the heads of the casing and at their sides by the inner surface of said casing and the faces of the inner clutch member. I prefer to provide the casing with a hardened-steel wearing-ring, as shown at 12.

Within the pockets are a series of rollers 13, which are of such diameter as to fit loosely at the curved bottoms of said pockets, which is the position they will assume when the casing of Fig. 1 is turned to the left. If said casing be turned to the right, the rollers will be instantly gripped between the casing and the straight faces of the clutch member 9, locking the two together and to the shaft.

At the beginning of the curve in each straight face of the part 9 such face is undercut at an acute angle, as shown at 14, and is machined to the depth of such undercut in order to provide a plane flat seat. Upon each of these seats is secured a hardened-steel wear-plate 15, the inner edge of which is beveled, so as to fit the undercut. The other end is secured by screws, as shown at 16. The outer face of each wear-plate makes a smooth joint with the curve at the bottom of the pocket, the said plate being of a thickness equal to the depth of the recessing of the clutch-face. At the upper or smaller end of the pocket both the clutch member and the wear-plate are beveled off to the intersection with the bottom of the next pocket. By making the inner member of the clutch with straight faces the clutching or gripping effectiveness is just as great as when curved faces are used, while it is easier, simpler, and cheaper to form a flat seat than a curved one and easier and cheaper to provide flat wear-plates than curved ones and to fit them accurately to such seats.

It is evident that the main body of the inner clutch is practically indestructible, since it is not exposed to wear, and that the comparatively cheap wear-plates can be renewed as often as may be necessary at small cost and without removing the part 9 from the shaft, it being only required that the casing be removed, which gives complete access to the whole interior.

It is further to be noted that if from any cause one plate should wear faster and require renewal sooner than others said plate can be singly removed without affecting the remainder, whereas were one face of the main clutch member itself in such a condition the whole structure would have to be removed and another substituted.

The clutch shown is single-acting and is operated by means of a cable coiled upon the casing between its flanges and connected to any source of power and motion which will transmit an oscillatory motion to said casing. With the single-acting clutch shown the shaft, while it turns only in one direction, is positively driven only by alternate motions of the casing, its own or its fly-wheel momentum continuing the rotary motion during the idle motion of the casing. My improvements are, however, equally adapted to double-acting clutches, in which the arrangement of casing and interior clutch members are duplicated upon the same shaft with a separate cable for each casing. Then the shaft can be positively driven in the same direction by both casings oscillating alternately in opposite directions.

What I claim is—

In a clutch, a driven shaft, an outer casing loosely mounted thereon, an inner clutch member keyed to the shaft and having peripheral pockets of a depth at the gripping-point equal to the diameter of the roller, plus the thickness of the plate, wear-plates in said pockets and secured removably to said inner clutch member, and rollers loose in said pockets but adapted to be gripped between said wear-plates and the inner surface of said casing.

In testimony whereof I have hereunto affixed my signature on this 6th day of August, 1906.

FRED STARR.

Witnesses:
J. H. BACON,
J. L. WHEAT.